United States Patent [19]

Bell et al.

[11] 4,135,182

[45] Jan. 16, 1979

[54] CIRCUIT FOR APPLYING ALPHA/NUMERIC DATA TO A TV RECEIVER

[75] Inventors: Wayne D. Bell, Bountiful; Earl T. Hansen, Taylorsville, both of Utah

[73] Assignee: Sperry Rand Corporation, New York, N.Y.

[21] Appl. No.: 807,765

[22] Filed: Jun. 17, 1977

[51] Int. Cl.[2] .................................. G06F 3/14

[52] U.S. Cl. .................................. 358/141; 325/105; 358/150; 328/31; 340/717; 340/803

[58] Field of Search .................................. 358/4; 325/105; 328/31 T; 340/324 AD

[56] References Cited

U.S. PATENT DOCUMENTS

| | | | |
|---|---|---|---|
| 3,017,625 | 1/1962 | Evans et al. | 340/324 A |
| 3,401,359 | 9/1968 | Becker | 325/105 |
| 3,685,039 | 8/1972 | Flanagan | 340/324 A |
| 3,822,363 | 7/1974 | Meyer et al. | 340/324 AD |
| 3,946,147 | 3/1976 | Camras | 358/4 |
| 4,026,555 | 5/1977 | Kirschner et al. | 340/324 AD |
| 4,034,983 | 7/1977 | Dash et al. | 340/324 AD |
| 4,034,990 | 7/1977 | Baer | 340/324 AD |

*Primary Examiner*—Marshall M. Curtis

*Attorney, Agent, or Firm*—John P. Dority; William E. Cleaver; Marshall M. Truex

[57] ABSTRACT

An electrical circuit for allowing the use of a TV receiver to display alpha/numeric data includes a pair of monostable multivibrators, logic circuitry and a tri-state gate for shaping and mixing digital horizontal and vertical retrace sync signals and alpha/numeric video signals to create a properly proportioned composite thereof. The circuit further includes an oscillator for generating a RF carrier signal, a field-effect transistor (FET) coupled between the oscillator and the output of the circuit which is adapted to be coupled to the antenna terminal of the TV receiver, and an emitter-follower device which feeds the composite signal to the FET for producing amplitude modulation of the RF carrier signal by the FET and transmission of the modulated signal to the TV receiver antenna terminals.

10 Claims, 2 Drawing Figures

CIRCUIT FOR APPLYING ALPHA/NUMERIC DATA TO A TV RECEIVER

BACKGROUND OF THE INVENTION

1. Field of the Invention

The present invention broadly relates to computer terminals and, more particularly, is concerned with an improved circuit for allowing the use of a conventional TV receiver to display alpha/numeric data without modification of the receiver.

2. Description of the Prior Art

Electrical circuits which would allow a person to connect a computer terminal to the antenna terminal of a conventional TV set and use the tube of the TV set to display alpha/numeric output data from the terminal, thereby avoiding the necessity of having a CRT display on the computer terminal, have been proposed in the past. Examples of such circuits are disclosed in U.S. Pat. Nos. 3,017,625; 3,685,039 and 3,822,363.

Generally, such circuits include a mixer for combining digital horizontal and vertical retrace sync signals and alpha/numeric video signals together to create a composite thereof, an oscillator for generating a RF carrier signal and a modulator which utilizes the composite signal to modulate the RF carrier signal and transmit the modulated signal to the antenna terminal of the TV receiver set. While these circuits appear to function satisfactorily, it is believed that improvement thereof in order to simplify the complexity and reduce the overall cost of the same would be desirable.

SUMMARY OF THE INVENTION

The electrical circuit of the present invention allows the use of a conventional TV receiver, such as found in most homes, for displaying alpha/numeric data, without modification of the TV set, and incorporates improvements which provide for a significant reduction in the quantity, size and cost of the components to accomplish this complex task.

According to the principles of the present invention, the improved electrical circuit shapes and mixes digital horizontal and vertical retrace sync signals and alpha/numeric video signals to create a properly proportioned composite thereof which is utilized to modulate a RF carrier signal suitable for coupling to the terminal of a broadcast band TV receiver antenna.

More particularly, a shaping and mixing portion of the improved circuit includes a pair of monostable multivibrators which respond to incoming horizontal and vertical retrace sync digital pulses, respectively, to establish the required widths of the pulses for subsequent utilization by the home TV receiver circuitry. The shaping and mixing circuit portion further includes logic circuitry followed by a tri-state gate with pull-up and pull-down resistors operatively associated therewith which together respectively function to combine the video pulses and the properly shaped horizontal and vertical sync pulses into a composite thereof and establish the three voltage levels of the sync and video (i.e., black and white) signal portions within the composite signal.

Still further, a modulating portion of the improved circuit includes an emitter-follower device, an oscillator for generating a RF carrier signal and a field-effect transistor (FET) for modulating the RF carrier signal. The FET is coupled between the oscillator and the output of the circuit which is adapted to be coupled to the antenna terminals of the TV receiver. The emitter-follower device feeds the composite signal to the FET for producing amplitude modulation of the RF carrier signal by the FET and transmission of the modulated signal to the TV receiver antenna terminals.

Specifically, the RF carrier signal from the oscillator is applied to the source of the FET, while the composite signal fed from the emitter-following device is applied to the gate of the FET and acts as a varying voltage which controls the resistance of the FET to the passage of the RF signal therethrough from the source to the drain of the FET. In other words, the amount or amplitude of the RF signal reaching the drain of the FET is a function of resistance in the FET. Therefore, the amplitude of the amplitude modulated RF signal delivered to the TV receiver will vary proportionately to the voltage of the composite signal applied to the FET gate, which voltage is directly proportional to the three level digital composite video signal produced by the tri-state gate of the shaping and mixing portion of the improved circuit.

DETAILED DESCRIPTION OF THE INVENTION

The Invention — In General

Figure 1:
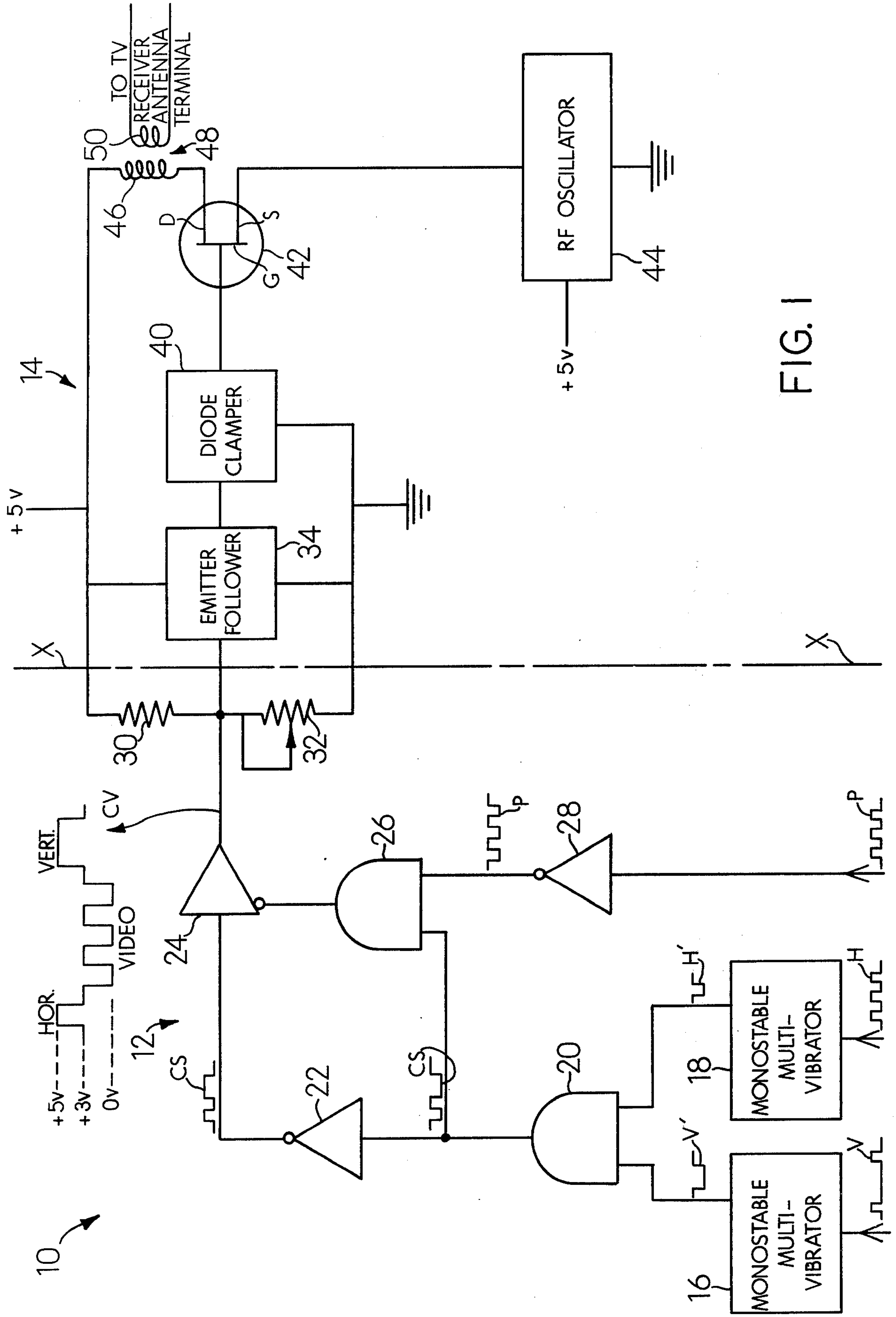
FIG. 1 is a schematic diagram, partially in block form, illustrating the improved electrical circuit of the present invention for applying alpha/numeric data to a conventional TV receiver.
Figure 2:
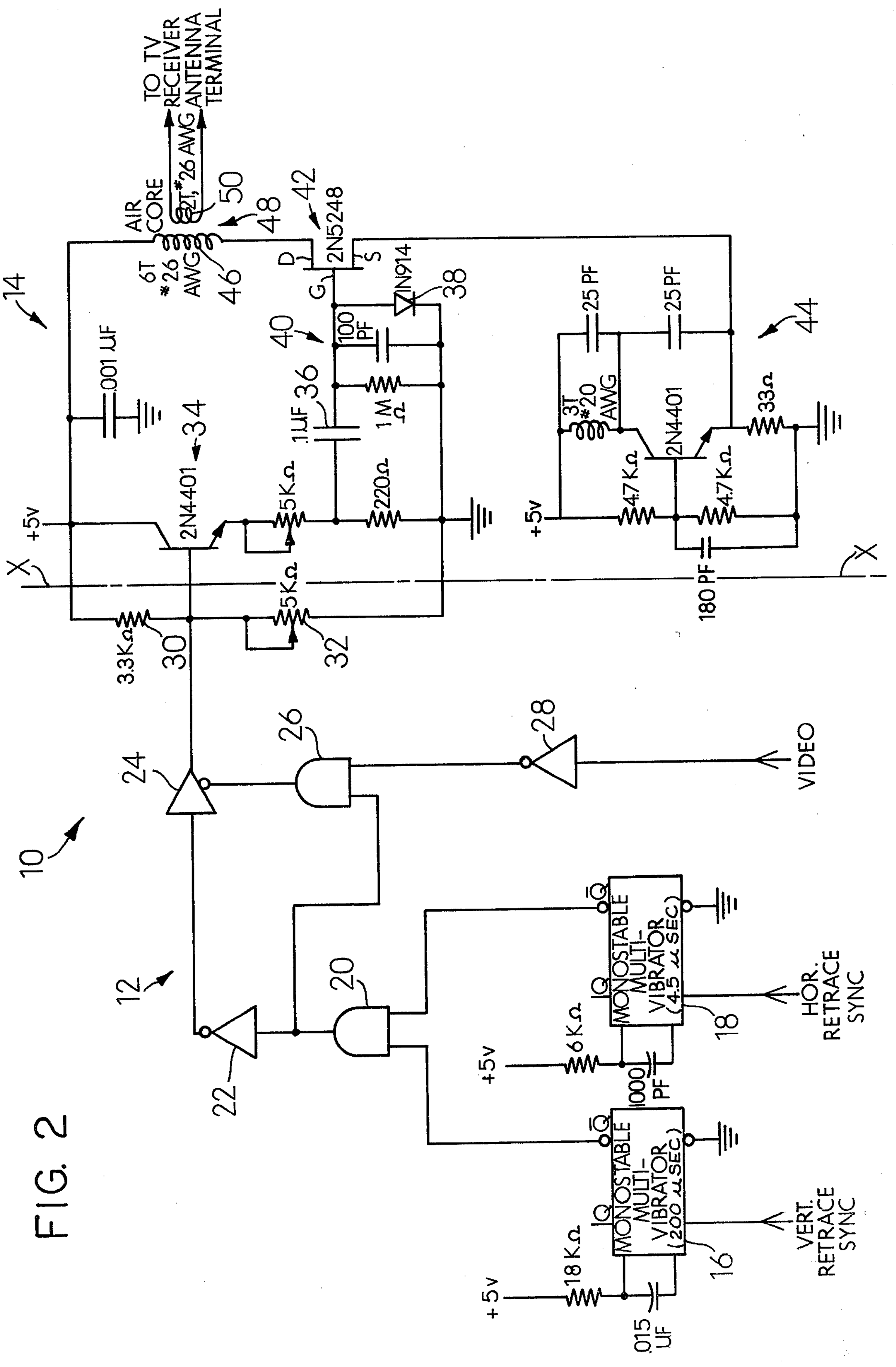
FIG. 2 is a schematic diagram illustrating the improved circuit of the present invention in greater detail than shown in FIG. 1.

Referring to FIGS. 1 and 2, there is shown the preferred embodiment of the improved circuit of the present invention, being generally designated 10. The circuit 10 would allow a person to connect a computer terminal to his home television set and use the TV screen to display the alpha/numeric data, thereby avoiding the necessity to have a CRT display on the computer terminal. The circuit would be incorporated into an electronic package having a keyboard and a coaxial cable for connecting it to the TV antenna terminal on the back of the TV set.

The circuit 10 may be viewed as being comprised by two basic portions. The portion of the circuit on the left side of broken line X—X in FIGS. 1 and 2, being generally designated as 12, receives digital signals (in the form of vertical retrace sync, horizontal retrace sync and video pulses) from the logic circuit of the computer terminal (not shown), such as UTS 50 terminal manufactured and sold by the SPERRY UNIVAC Division of Sperry Rand Corporation, and shapes and then mixes these three types of pulses in order to provide a digital video composite thereof. The portion of the circuit on the right side of broken line X—X, being generally designated as 14, modulates an RF signal, using the digital composite signal produced by the left side circuit portion, to produce a modulated signal suitable for receipt by the home TV set. The modulated signal is fed through a transformer to the antenna terminal on the back of the TV set.

SHAPING AND MIXING CIRCUIT PORTION

First, with respect to the left side circuit portion 12, the individual vertical retrace sync, horizontal retrace sync and video signals coming from the terminal logic circuit are not necessarily in conformity to TV standards as to pulse width requirements. Therefore, initially, these pulses, at least the vertical and horizontal sync ones, must be reshaped.

For this purpose, the circuit portion 12 includes a first one-shot (monostable) multivibrator 16 which receives the incoming positive-going vertical retrace sync pulse V from the terminal and outputs a correctly shaped negative-going vertical sync pulse V' having a width of approximately 200 microseconds and a second one-shot (monostable) multivibrator 18 which receives the incoming positive-going horizontal retrace sync pulse H from the terminal and outputs a correctly shaped negative-going horizontal sync pulse H' having a width of approximately 4.5 microseconds. There are actually many more horizontal sync pulses than vertical sync pulses.

The outputs of both multivibrators 16, 18 are fed to logic circuitry of the shaping and mixing circuit portion 12 which begins the process of combining the pulses together. The logic circuitry includes an AND gate 20. As each negative-going signal is received by the AND gate 20, it is passed. If a vertical pulse V' is received at the same time as several of the horizontal pulses H', the former being of greater width will completely absorb the latter. At the output of the AND gate 20, there is now produced a composite sync signal CS. The composite sync signal CS is not only fed on through an inverter 22 and therefrom to a tri-state gate 24 for purposes to be explained later on, it is also used to blank out or prevent passage of video signals P through a video blanking or inhibiting gate 26 of the logic circuitry at certain intervals, such being those intervals during which horizontal and vertical retracings on the TV screen are to occur.

An inverter 28 changes the video signal P from positive-going to negative-going while the inverter 22 changes the composite sync signal CS from negative-going to positive-going.

The respective signals CS and P are combined together at the tri-state gate 24 such that negative-going video signals P appear between each of the positive-going horizontal sync signals H' as well as between horizontal sync signals and positive-going vertical sync signals V'. There is no change in polarity of signals at the tri-state gate 24.

The tri-state gate 24 has the following three states: (1) a high level, (2) a low level and (3) a floating level which is determined by something exterior to the gate. In this invention, the floating level (being the +3v level which represents the black in the video) is determined by the ratio of the resistances of the two resistors 30 and 32. One resistor 32 is made adjustable so that the floating level of the tri-state gate 24 can be varied up and down. Thus, when the tri-state gate 24 is not being driven high (at +5v) by the sync pulses or low (at 0v) by the video pulses, the gate 24 will seek the floating level (the black on the video) which is the voltage level (+3v) as determined by the ratio of the resistors 30 and 32. Hence, these resistors 30 and 32 are termed pull-up and pull-down resistors.

MODULATING CIRCUIT PORTION

The three level or state, digital composite video signal CV (being shown in enlarged form in FIG. 1 in comparison to composite sync CS and video pulses P) produced by the tri-state gate 24 with the pull-up and pull-down resistors 30, 32 then goes to an emitter-follower device 34 of the modulating portion 14 of the circuit. The device 34 provides a low impedance driving source (signal) for the modulating circuit portion 14.

A capacitor 36 and diode 38 (FIG. 2) form a clamp 40 to establish a black level or reference level for the video signal which is necessary prior to any use being made of the video signal. The video signal, in other words, can be transmitted to the receiver; but prior to its use or display, it has to be clamped to establish a black reference level.

A field effect transistor (FET) 42 of the modulating circuit portion 14 receives the output voltage signal from the emitter-follower device 34 through the diode clamper 40. The FET 42 acts as a variable resistor. The resistance is varied by the variation in the voltage applied on the gate G of the FET 42 from the emitter-follower device 34.

A RF signal from a conventional Colpitts-type oscillator 44 of the modulating circuit portion is applied to the source S of the FET 42. The amount of the RF signal applied to source S which is allowed to reach the drain D of the FET 42 is a function of the resistance in the FET, the resistance being controlled by varying the voltage on the gate G.

The output (amplitude modulated RF signal) from the drain D of the FET 42 goes to a primary winding 46 of a RF transformer 48 whose secondary winding 50, in turn, may be coupled to the antenna terminal of a conventional TV receiver by a cable (not shown). The amount (amplitude) of the RF signal which is transmitted to the output of the modulating circuit portion is, again, a function of the voltage applied to the gate G of the FET 42. Therefore, the amplitude of the RF output will vary proportionately to the voltage of the signal applied to the FET gate G. And, the voltage signal applied to the FET 42 by the emitter-follower device 34 is directly proportional to the three level digital composite video signal CV produced by the tri-state gate 24 of the shaping and mixing portion 12 of the improved circuit 10.

As noted above, the detailed circuit of FIG. 2 illustrates the block electrical components of FIG. 1 in greater detail; and one practical example of values for resistance, capacitance, inductance, voltage and frequency along with the particular diode and transistor types are indicated in FIG. 2.

Having thus described the invention, what is claimed is:

1. An electrical circuit for applying data to a TV receiver, comprising:

a shaping and mixing circuit portion for producing a composite signal from data-bearing video pulses and horizontal and vertical sync pulses, said shaping and mixing circuit portion including means for respectively responding to incoming digital horizontal and vertical sync pulses and shaping the same to widths required for utilization by said TV receiver, a tri-state gate, logic means interconnecting said shaping means and said tri-state gate and responding to incoming video pulses for feeding said sync and video pulses in a desired sequential arrangement to said tri-state gate, and pull-up and pull-down resistors operatively associated with said tri-state gate such that together said gate and resistors function to combine said horizontal and vertical sync pulses and video pulses into said composite thereof and establish three voltage levels of sync and video signal portions within said composite signal; and a modulating circuit portion including an oscillator for generating a RF carrier signal, a field-effect transistor (FET) coupled to said oscillator for modulating the RF carrier signal, and means for feeding said composite signal to said FET for producing amplitude modulation of said carrier signal by said FET and transmission of said modulated signal to said TV receiver.

2. The electrical circuit as recited in claim 1, wherein said modulating circuit portion further includes an output adapted to be coupled to an antenna terminal of said TV receiver, and said FET is coupled between said oscillator and said output.

3. The electrical circuit as recited in claim 1, wherein said means for feeding said composite signal to said FET is an emitter-follower device.

4. The electrical circuit as recited in claim 1, wherein said RF carrier signal is applied to a source of said FET, while said composite signal is applied to a gate of said FET such that the amplitude of said modulated RF signal passed from said source to a drain of said FET will vary in proportion to the variation of said composite signal applied to said gate of said FET.

5. The electrical circuit as recited in claim 1, wherein said modulating circuit portion further includes clamping means interposed between said composite signal feeding means and said FET for establishing a black level for said signal.

6. An electrical circuit for applying data to a TV receiver, comprising:

a shaping and mixing circuit portion including means for respectively responding to incoming digital horizontal and vertical sync pulses and shaping the same to widths required for utilization by said TV receiver, a tri-state gate, logic means interconnecting said shaping means and said tri-state gate and responding to incoming data-bearing video pulses for feeding said sync and video pulses in a desired sequential arrangement to said tri-state gate, and pull-up and pull-down resistors operatively associated with said tri-state gate such that together said gate and resistors function to combine said horizontal and vertical sync pulses and video pulses into a composite thereof and establish three voltage levels within the same; and a modulating circuit portion which utilizes said composite signal to modulate a RF carrier signal suitable for coupling to said TV receiver.

7. An electrical circuit for applying data to a TV receiver, comprising:

a shaping and mixing circuit portion including means for respectively responding to incoming digital horizontal and vertical sync pulses and shaping the same to widths required for utilization by said TV receiver, a tri-state gate, logic means interconnecting said shaping means and said tri-state gate for feeding said sync pulses and data-bearing video pulses in a desired sequential arrangement to said tri-state gate, said logic means including first gate means for receiving said properly shaped horizontal and vertical sync pulses from said shaping means and forming a composite thereof which is fed to said tri-state gate, and second gate means for receiving incoming data-bearing video pulses and responding to composite sync pulses from said first gate means so as to prevent the application of video pulses to said tri-state gate during time intervals when said composite sync pulses are fed to the same, and pull-up and pull-down resistors operatively associated with said tri-state gate such that together said gate and resistors function to combine said horizontal and vertical sync pulses and video pulses into a composite thereof and establish three voltage levels within the same; and a modulating circuit portion connected to said tri-state gate and said resistors for receiving said composite signal and modulating therewith a RF carrier signal suitable for coupling to said TV receiver.

8. The electrical circuit as recited in claim 6, wherein said shaping means includes a pair of one-shot monostable multivibrators, one for responding to and shaping the width of said horizontal sync pulse and the other for responding to and shaping the width of said vertical sync pulse.

9. The electrical circuit as recited in claim 8, wherein said logic means includes first gate means for receiving said properly shaped horizontal and vertical sync pulses from said multivibrators and forming a composite thereof which is fed to said tri-state gate, and second gate means for receiving incoming data-bearing video pulses and responding to composite sync pulses from said first gate means so as to prevent the application of video pulses to said tri-state gate during time intervals when said composite sync pulses are fed to the same.

10. The electrical circuit as recited in claim 7, wherein said modulating circuit portion includes an oscillator for generating said RF carrier signal, a field-effect transistor (FET) coupled to said oscillator for modulating the RF carrier signal, and means coupled with said tri-state gate and said resistors for feeding said composite signal to said FET for producing amplitude modulation of said carrier signal by said FET and transmission of said modulated signal to said TV receiver.

* * * * *